HARRISON STAGGS.

Improvement in Bee Hives.

No. 122,542.

Patented Jan. 9, 1872.

2 Sheets--Sheet 1.

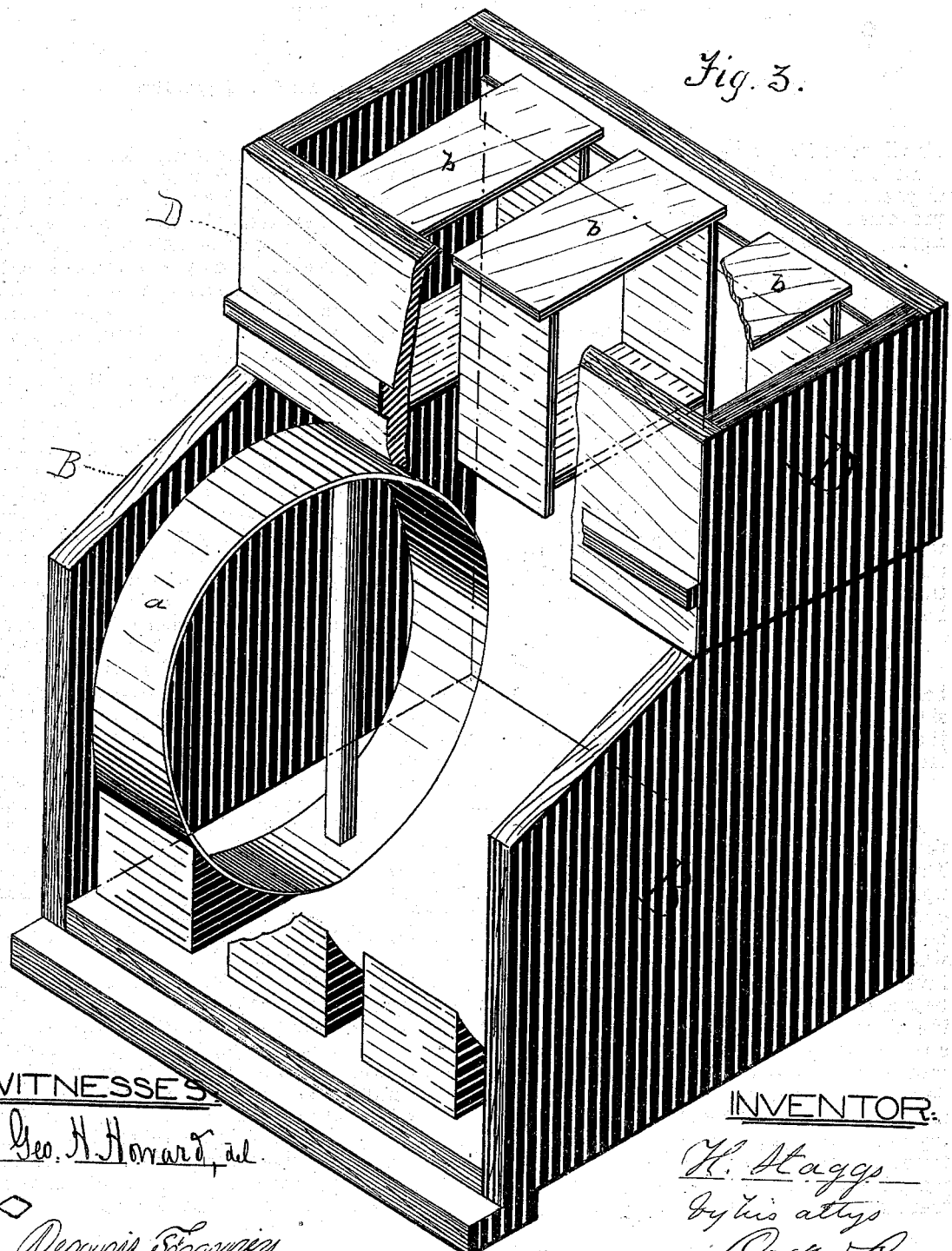

UNITED STATES PATENT OFFICE.

HARRISON STAGGS, OF TOPEKA, KANSAS.

IMPROVEMENT IN BEE-HIVES.

Specification forming part of Letters Patent No. 122,542, dated January 9, 1872.

*To all whom it may concern:*

Be it known that I, HARRISON STAGGS, of Topeka, Kansas, have invented certain Improvements in Bee-Hives, of which the following is a specification:

Nature and Objects of the Invention.

The invention relates to that class of bee-hives that is constructed with two apartments, both of which are constructed to receive removable frames in which the comb and honey are deposited, one of the apartments being placed above the other and so arranged as to be entirely distinct and independent, and both of which are provided with doors sufficiently large to permit the readiest removal and insertion of their frames and easy access to the bees occupying them. Its object is to provide a hive which, while possessing all the advantages of an ordinary hive, facilitates increased production of comb and honey and propagation of bees.

Description of the Accompanying Drawing.

Figure 1:
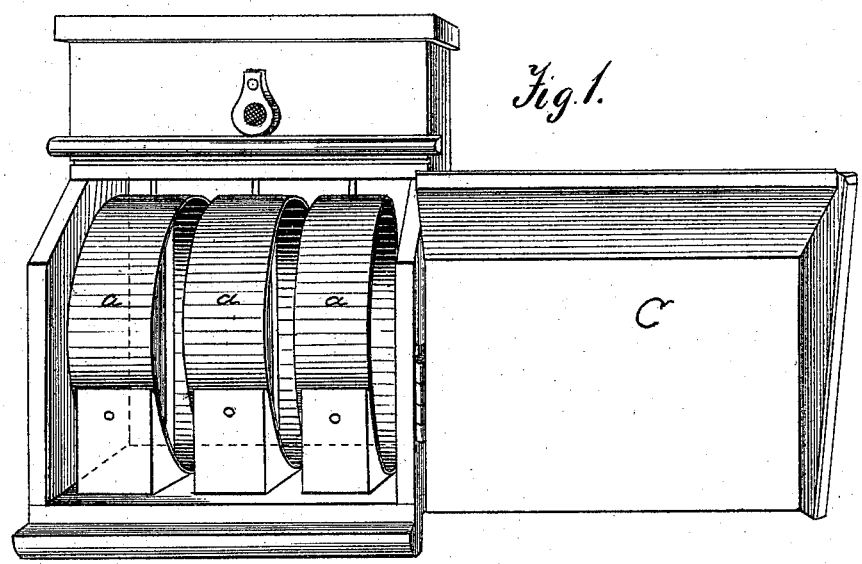
Figure 2:
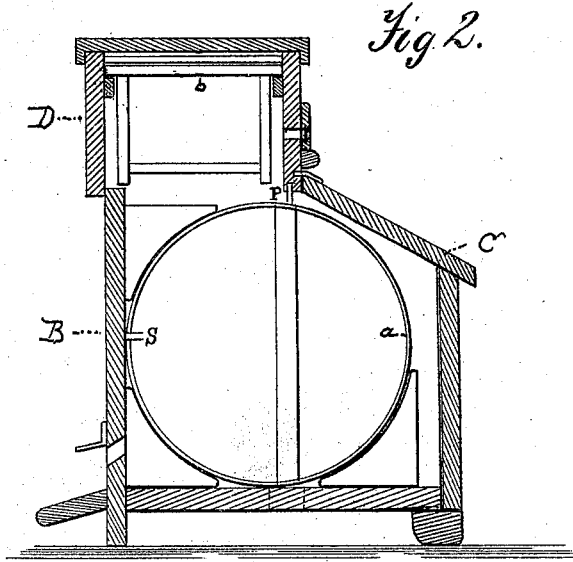

Figure 1 is a front view of the hive, the door being open. Fig. 2 is a side view, one of the sides being removed. Fig. 3 is a view showing the general construction of the hive and the relations of its various parts.

General Description.

A box, B, of any suitable shape, is used for the home or principal apartment of the hive. This apartment is provided with a door, C, hung upon hinges so as to admit of its being readily opened, which embraces the entire front of the home, and which, when opened, exposes the whole side of the principal apartment of the hive, thus permitting the readiest access to the bees and facilitating all necessary acts affecting them. This apartment or home is constructed to receive any suitable number of frames, $a\ a\ a$, which are placed side by side, being hung in position upon pins or secured in any convenient manner, sufficient intervals being left to permit the passage of the bees between the frames, and care being taken to so place them that, while they may be removed, there will be no possibility of their falling and thus interfering with the occupation and industry of the home. The frames $a\ a\ a$ are of circular form, but may, however, be made rectangular or otherwise. The home may be ventilated and a means of ingress and egress for the bees provided as may appear expedient. At its top or upper side an opening is cut, and immediately above and over this opening a second box or apartment, D, is placed, the top of which consists of a lid that may be removed at pleasure. The box or apartment D is made larger than the opening in the top of the home and is arranged so as to receive a suitable number of frames, $b\ b\ b$, which frames are of circular form, but may be made rectangular or otherwise, and are constructed with projections so as to rest or hang upon the inner sides of the apartment D, and which are inserted or taken out from above, the removal of the lid rendering it practicable to do so. When desired the opening between the two apartments may be closed by removing the frames $b\ b\ b$ and covering it with any suitable material, the effect of which will be to divide the hive into two distinct sections. If it may be necessary to abandon the apartment D it can be filled with any warm substance, thus adding to the warmth and comfort of the home below.

Very many advantages pertaining to the propagation of queen-bees, the production of an increased quantity of comb, and the cleaning of the hive and other matters will be found to be embraced in the apartment D and its incidents, as used in connection with the other or principal apartment. Chief among the advantages intimated may be mentioned that relating to the economy of the heat of the hive.

It will be observed that the location of the apartment D is such that it catches the heat that in an ordinary hive is lost. A division of the hive, too, encourages the general industry and insures ventilation without too much space.

The advantages connected with the shape of the frames are numerous. Being in circular form, there are no cold corners which afford a place of concealment for drones. It will be found, too, that the comb will be heavier and of more uniform weight and thickness.

It will be found practicable to apply the usual moth-traps and otherwise to provide for the safety and convenience of the bees while in the hive.

What I claim as my invention, and desire to secure by Letters Patent, is—

1. The combination of the frames $a$, constructed as described, when hung in the manner shown, with a full-front opening door, substantially in the manner and as and for the uses and purposes shown and described.

2. The relative arrangement of the frames $a$, surplus-honey department D provided with the frames $b$ covering laterally but one-half of the space above the hive, substantially as shown and described.

In testimony that I claim the foregoing improvement in bee-hives, as above described, I have hereunto set my hand and seal this 19th day of August, 1871.

HARRISON STAGGS. [L. S.]

Witnesses:
WILLIAM J. STAGG,
F. P. BAKER.

(9)